US005793130A

United States Patent [19]
Anderson

[11] Patent Number: 5,793,130
[45] Date of Patent: Aug. 11, 1998

[54] MINIATURE ELECTRIC GENERATOR AND LIGHTING APPARATUS

[76] Inventor: Marty J. Anderson, 303 #1 N. 10th St., Ozark, Mo. 65721

[21] Appl. No.: 797,487

[22] Filed: Feb. 7, 1997

[51] Int. Cl.[6] .......... H02K 21/24; H02K 15/00; F21V 31/00
[52] U.S. Cl. .......... 310/50; 310/40 MM; 310/42; 310/47; 310/48; 310/73; 310/98; 362/119; 362/120; 362/192
[58] Field of Search .......... 310/40 MM, 42, 310/47, 48, 50, 67 A, 69, 73, 153; 362/96, 119, 120, 192, 193, 228, 229

[56] References Cited

U.S. PATENT DOCUMENTS

| | | | |
|---|---|---|---|
| 1,528,754 | 3/1925 | Bresson | 362/61 |
| 1,607,562 | 11/1926 | Potter | 362/61 |
| 1,695,794 | 12/1928 | Becker, Jr. | 362/61 |
| 2,310,166 | 2/1943 | Way | 310/50 |
| 2,525,588 | 10/1950 | Cameron et al. | 310/50 |
| 2,852,051 | 9/1958 | Bickner | 144/136 |
| 3,573,479 | 4/1971 | Rieth | 310/83 |
| 3,590,232 | 6/1971 | Sadowski | 240/2 |
| 3,614,414 | 10/1971 | Gores | 240/2 |
| 3,742,264 | 6/1973 | Anderson et al. | 310/42 |
| 3,845,291 | 10/1974 | Portyrata | 240/26 |
| 4,280,117 | 7/1981 | Furusawa | 340/81 R |
| 4,298,910 | 11/1981 | Price | 362/35 |
| 4,476,406 | 10/1984 | Komatsu | 310/67 A |
| 4,539,496 | 9/1985 | Thomas et al. | 310/68 B |
| 4,555,656 | 11/1985 | Ryan | 3350/5 |
| 4,564,889 | 1/1986 | Bolson | |
| 4,616,298 | 10/1986 | Bolson | 362/192 |
| 4,642,738 | 2/1987 | Meller | 310/83 |
| 4,678,922 | 7/1987 | Leininger | 290/54 |
| 4,777,394 | 10/1988 | Hayashi | 310/83 |
| 4,782,431 | 11/1988 | Park | 362/61 |
| 4,831,296 | 5/1989 | Nagaba | 310/86 |
| 4,908,808 | 3/1990 | Knapen et al. | 368/157 |
| 4,973,205 | 11/1990 | Spaulding | |
| 5,267,129 | 11/1993 | Anderson | 362/96 |
| 5,359,500 | 10/1994 | Parker | 362/83.3 |
| 5,412,546 | 5/1995 | Huang | 362/119 |
| 5,525,842 | 6/1996 | Leininger | 290/54 |

FOREIGN PATENT DOCUMENTS 2523891 9/1983 France.
3119689 12/1982 Germany.

Primary Examiner—Thomas M. Dougherty
Assistant Examiner—Tran N. Nguyen
Attorney, Agent, or Firm—Shook, Hardy & Bacon L.L.P.

[57] ABSTRACT

A miniature electric generator and lighting apparatus is provided for use in a power-driven tool. The apparatus includes a rotor assembly 22 having a permanent magnet, and a stator assembly 24 within which the shaft and magnet are received. The stator assembly 24 includes a pair of electrically conductive arms 38 extending on opposite sides of the rotor, an electrically conductive shank 40 connecting the arms together, and a winding 36 of electrically conductive wire presenting a pair of opposed ends. A lamp 54 is connected to the ends of the winding by a circuit 52 so that it is powered upon rotation of the shaft. A housing assembly 30 supports the stator assembly 24 on the output shaft of the tool, and is secured to the tool. The housing assembly 30 and cooperating structure 42 position the stator assembly 24 relative to the magnet 32 to prevent contact between the stator element 34 and the magnet during rotation of the output shaft 14. The generator 22, 24 can alternately be used to power a battery charger or any other mechanism, and an extension cord, drop cord or the like can be employed to supply electricity from the generator to a remote mechanism to be powered.

17 Claims, 2 Drawing Sheets

MINIATURE ELECTRIC GENERATOR AND LIGHTING APPARATUS

BACKGROUND OF THE INVENTION

The present invention relates generally to electric generators, and more particularly to a miniature electric generator and lighting apparatus adapted for use with pneumatic or electric power tools and the like.

In many manufacturing and industrial maintenance settings, pneumatic and electric tools are used to construct and repair products. In these settings, frequently a worker is required to access a small, hard to reach place that is out of the line of normal illumination of conventional manufacturing area lighting. It is common for the worker to carry a separate DC or AC powered, hand-held light in order to provide additional lighting of the immediate work area.

However, because conventional lighting devices typically must be hand-held, the worker may quickly become tied up between handling the tool and the light while also positioning herself and the work piece in a proper orientation. Further, because pneumatic and electric power is already commonly available in the work place for use in powering the tools typically used, the provision of a separate DC or AC power source in addition to the lines already present represents unnecessary duplication of power lines in the work area which inhibits movement of workers and reduces their efficiency.

Another disadvantage to using most presently available DC powered lighting devices is environmental in nature, and relates to the problem of disposal of batteries and the like which are used to supply the power for such devices. It would be desirable to provide a lighting apparatus that does not adversely affect the environment and that is powered by already available means typically present in a manufacturing or maintenance environment.

SUMMARY OF THE INVENTION

It is an object of the present invention to provide a miniature generator and lighting apparatus which can be used in association with electric and pneumatic tools in order to provide focused light onto the immediate area surrounding the point at which work is being done or at which a tool is directed, wherein the lighting apparatus is powered by the same energy used to power the tools.

It is another object of the invention to provide a miniature generator which can be used with electric or pneumatic tools in order to provide a collateral source of electric power on the tools that is available for use in any desired manner, such as for charging a DC power supply or for powering any other desired electric implement.

Yet another object of the invention is to provide a miniature generator and lighting apparatus that is of a size appropriate for receipt on the end of an electric or pneumatic tool, and does not present a large profile that would otherwise interfere with use and operation of the tool.

In accordance with these and other objects evident from the following description of a preferred embodiment of the invention, a miniature electric generator and lighting apparatus is provided for use on a power-driven tool. The apparatus includes a rotor in the form of a permanent magnet affixed to a rotary output shaft of the tool, and a stator within which the rotor is received. The stator includes a pair of electrically conductive arms extending on opposite sides of the rotor, an electrically conductive shank connecting the arms together, and a winding of electrically conductive wire presenting a pair of opposed ends. A lamp is connected to the ends of the winding so that the lamp is powered upon rotation of the rotor within the stator. A housing supports the stator on the output shaft of the tool, and includes a means for securing the housing in place on the tool and a positioning means for positioning the stator relative to the magnet of the rotor to prevent contact between the stator and the magnet during rotation of the output shaft.

By providing a generator and lighting apparatus in accordance with the present invention, numerous advantages are realized. For example, by housing the stator around the rotor, a miniature construction results which provides focused light onto the immediate area surrounding the point at which work is being done or at which the tool is directed. In addition, because the apparatus uses the rotation of the output shaft of the tool to generate the necessary electricity to power the lamp, it is not necessary to employ an external or secondary power source or a separate switch for the lamp.

According to another aspect of the invention, the generator can alternately be used to power a battery charger or other mechanism, and can employ an extension cord, drop cord or the like to supply electricity from the implement to a lamp or other remote implement to be powered.

BRIEF DESCRIPTION OF THE DRAWING

The preferred embodiment of the present invention is described in detail below with reference to the attached drawing figures, wherein.

DETAILED DESCRIPTION OF THE PREFERRED EMBODIMENT

Figure 2:
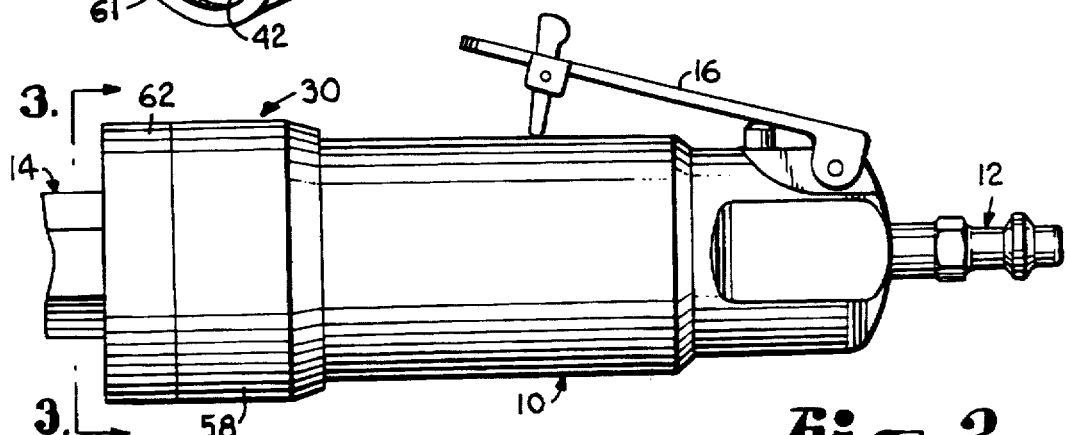
FIG. 2 is a side elevational view of the grinder.
Figure 4:
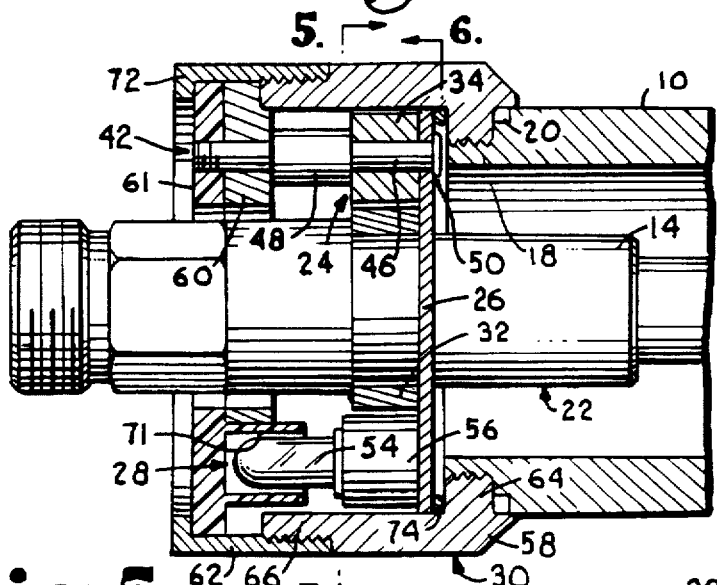
FIG. 4 is a sectional view taken along line 4—4 of FIG. 3.

A pneumatic grinder is shown in FIG. 2, which incorporates a miniature grinder and lighting apparatus constructed in accordance with a preferred embodiment of the invention. The grinder includes an elongated body 10 presenting proximal and distal ends, a coupling 12 at the proximal end of the body for coupling the tool to a conventional source of pressurized air, and a rotary output shaft 14 protruding from the distal end of the body and sized for receipt of a rotary grinder. A hand-actuated lever 16 is mounted on the body for actuating a valve that supplies pneumatic pressure to the tool to drive rotation of the output shaft. The body 10 is cylindrical, and as shown in FIG. 4, presents an externally threaded section 18 at the distal end for receiving the apparatus. In addition, a small stepped groove is formed in the exterior of the body adjacent the threaded section for receiving an O-ring 20.

Although the preferred embodiment of the invention is described with reference to a pneumatic grinder, it is understood that the invention can likewise be employed with any other type of pneumatic or electric tool, or any other mechanism, without limitation, so long as the tool or mechanism includes a driven rotary shaft from which mechanical energy can be drawn by the apparatus for use in generating electricity.

Figure 1:
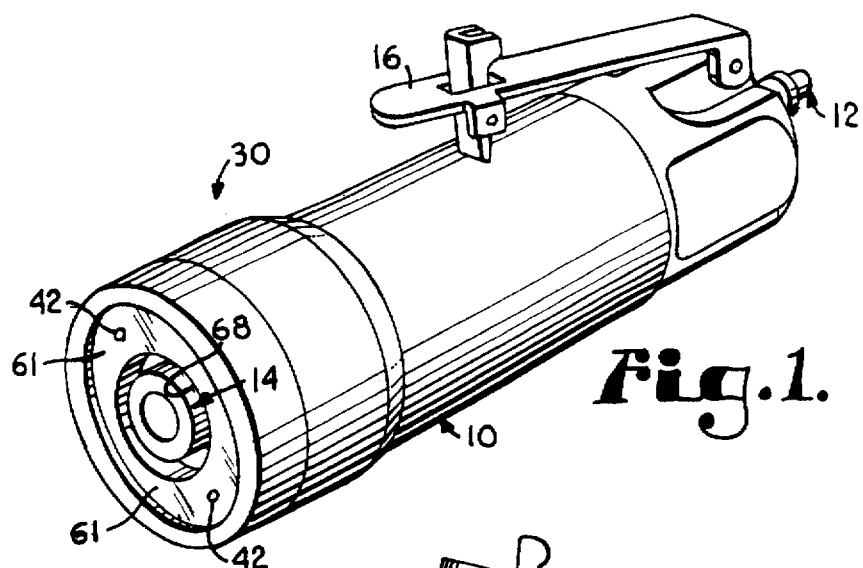
FIG. 1 perspective view of a pneumatic grinder incorporating a miniature generator and lighting apparatus constructed in accordance with the preferred embodiment.

The miniature generator and lighting apparatus broadly includes a rotor assembly 22, a stator assembly 24, a support plate 26, a pair of lamp assemblies 28, and a housing assembly 30. As illustrated in FIG. 1, the entire apparatus is sized for receipt on the distal end of the tool such that focused light can be directed onto the immediate area surrounding the point at which work is to be done or at which the tool is directed. Although the diameter of the housing assembly 30 is somewhat greater than that of the tool body in the preferred embodiment, it presents a low profile that does not obstruct the user's view of the grinder, and does not interfere with handling of the tool.

The rotor assembly 22 is shown in FIG. 4, and includes the rotary output shaft 14 of the tool, and an annular permanent magnet 32 that is affixed to the shaft adjacent the distal end of the tool. The shaft 14 is preferably somewhat longer than a conventional output shaft in order to accommodate the magnet 32, but is otherwise conventional, including a proximal end that is connected to an internal drive assembly of the tool and a distal end that is threaded for receipt of a conventional grinder or the like. The magnet includes an inner surface that is affixed to the shaft, e.g. by an adhesive or the like, and an outer cylindrical surface. Alternately, a plurality of magnets may be provided around the circumference of the rotary shaft of the tool in place of the single magnet shown.

Figure 5:
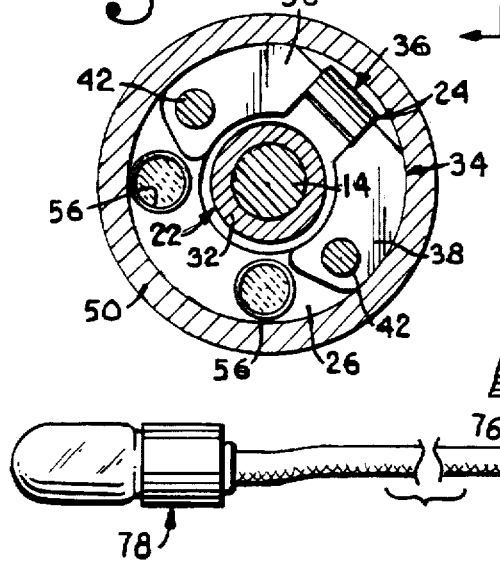
FIG. 5 is a sectional view taken along line 5—5 of FIG. 4.
Figure 6:
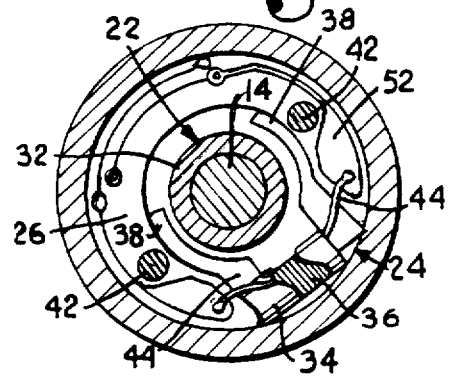
FIG. 6 is a sectional view taken along line 6—6 of FIG. 4.

As shown in FIG. 5, the stator assembly 24 includes a C-shaped stator element 34 formed of an electrically conductive material, and a winding 36 of copper wire or other suitable conductor. The stator element 34 includes a pair of arcuate arms 38 extending on opposite sides of the rotor, and a shank 40, as shown in FIG. 6, extending between and connecting the arms together. The arms 38 include opposed inner circumferential surfaces defining a diameter slightly larger than the diameter defined by the magnet 32 on the shaft so that the rotor is received between and spaced from the opposing inner circumferential surfaces of the arms. In addition, a pair of diametrically opposed holes are formed in the arms and extend axially through the stator element for receiving pins 42 that position the stator element within the housing assembly and maintain the spacing between the stator element 34 and the magnet 32.

The winding 36 is coiled around the shank of the stator element 34 and presents a pair of wire ends 44 across which current flows when the rotor is rotated within the stator. The size of the wire and the number of turns is variable, and can be selected by one of ordinary skill in the art to obtain a desired current from the apparatus. In an exemplary embodiment, 250 winds of a 31 wire are employed. A sleeve of heat-shrinkable protective material is preferably received over the winding to protect the winding from debris generated by the tool.

The support plate 26 is generally C-shaped, presenting a pair of opposed free ends that extend beneath the arms of the stator element 34 and terminate adjacent the shank and winding. The support plate 26 is formed of an electrically insulative material typical of those used in the manufacture of circuit boards, such as a synthetic resin or the like. The plate is generally planer, presenting opposed, axially spaced first and second side surfaces. A central cutout is defined by the plate that is of a diameter slightly larger than the diameter defined by the arms of the stator element such that the arms protrude radially into the cutout area of the support plate.

As illustrated in FIG. 4, the stator element is secured to the first surface of the support plate 26 by the pins 42. Preferably, the pins each include a reduced diameter section 46 that is received in one of the holes in the stator element, and enlarged diameter sections 48, 50 are formed on either end of the section for sandwiching the stator element and support plate together. The end section 50 of each pin 42 is preferably formed of the same diameter as that of the reduced diameter section so that the pin can be inserted into the stator element and support plate during assembly. The end 50 is then staked or otherwise deformed to hold the stator element and support plate together. As such, the pins are actually rivets. However, other suitable conventional fastening expedients could alternately be used.

As shown in FIG. 6, a circuit 52 is printed or otherwise applied to the second surface of the support plate 26 for providing an electrical connection between the winding ends 44 and the lamp assemblies 28. The circuit includes large pads adjacent the free ends of the plate, and the wire ends 44 are soldered or otherwise connected to these pads in a conventional manner. The large size of the pads simplifies assembly of the apparatus. The circuit also includes smaller pads located beneath each of the lamp assemblies for supplying power to the lamp assemblies during rotation of the shaft. Holes are formed in the support plate within each of the smaller pads so that wire connectors from the lamp assemblies can be passed through the plate and soldered or otherwise connected to the pads. As such a complete circuit is defined for providing power to the lamp assemblies.

Returning to FIG. 4, the lamp assemblies 28 are identical to one another, and each includes a conventional lamp 54 and a socket 56 sized for receipt of the lamp. Thus, the lamps are replaceable. Each socket is generally cylindrical, presenting a bottom end that is secured to the first side surface of the support plate 26, e.g. by an adhesive or the like, and an open, upper free end within which one of the lamps is received. The wire connectors of the socket extend through the support plate and are soldered to the small pads of the circuit as described above.

As shown in FIG. 1, the housing assembly broadly includes an elongated tubular body 58 presenting proximal and distal ends, a face plate 60 adapted to fit within the distal end of the body, a lens 61 received on the face plate, and a retainer 62 for securing the face plate and lens in place. With reference to FIG. 4, the body presents radially opposed inner and outer circumferential surfaces, and the inner surface is of a diameter sized for receipt over the distal end of the body 10 of the tool. A section 64 of the inner circumferential surface is stepped to present a reduced diameter relative to the remainder of the body, and the reduced diameter section is threaded to mate with the threaded section 18 of the tool body 10. As such, the threaded section 64 defines a means for securing the housing in place on the tool. Any other conventional fastening expedient could be used in place of the threaded connection shown in the preferred embodiment. The outer circumferential surface of the housing includes a section 66 at the distal end of the body that is threaded to receive the retainer 62.

Figure 3:
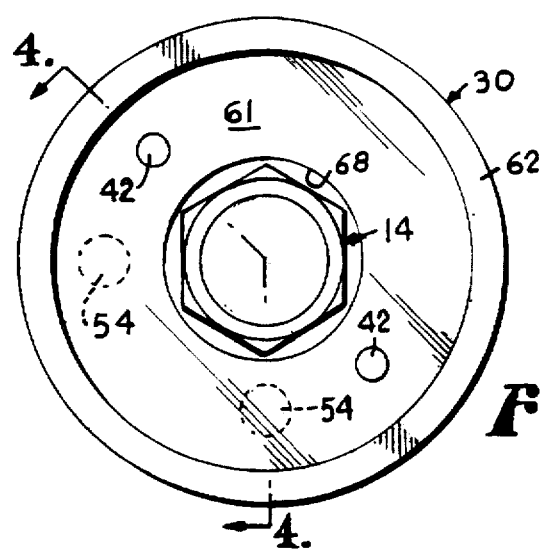
FIG. 3 is a sectional view taken along line 3—3 of FIG. 2.

The face plate is shown in FIG. 3, and is generally circular, presenting axially opposed, planer side faces, and including a central aperture 68 sized for receipt of the output shaft of the tool, and a pair of cutouts 70, as shown in FIG. 4, aligned with the lamps 54. In addition, the face plate 60 includes a pair of apertures through which the pins 42 extend. Although the face plate, retainer and housing body are formed of aluminum in the preferred embodiment, they can also be formed of any other suitable material. For example, the face plate can be constructed of a transparent material such as a transparent synthetic resin material, and the other components of the housing assembly can be constructed of any synthetic resin or other suitable material. As shown in FIG. 4, the outer circumferential edge of the face plate is stepped for receipt in the body 58 so that the face plate is held in place on the body upon assembly.

The lens 61 is circular, presenting opposed planer side faces, and includes a central aperture sized for receipt of the output shaft of the tool. A pair of axially extending tubular sleeves 71 protrude from the inner side face of the lens in alignment with the lamps 54. The sleeves 71 receive the lamps and define reflectors for reflecting light from the lamps through the lens. Preferably, the inside surfaces of the sleeves 71 are coated or lined with a reflective material that increases the amount of light reflected through the lens.

In order to hold the lens 61 in place during assembly of the housing, a pair of holes are formed in the lens in registration with the pins 42. The lens is thus received on the pins and secured in place by the retainer 62. The retainer 62 is ring-shaped, and presents a threaded inner surface that mates with the threaded section 66 of the body and an inwardly directed flange 72 that engages the lens 61 to hold the retainer, lens and face plate on the body. The body 58, retainer 62 and face plate 60 of the housing assembly 30 are thus fixed in place on the tool and, together with the pins 42, function to position the stator assembly 24 relative to the magnet 32 of the rotor and to prevent contact between the stator element and the magnet during rotation of the output shaft.

As discussed above, the O-ring 20 is received in the proximal end of the housing body 58 adjacent the stepped section 64, and is received in the stepped groove of the body 10 of the tool. The O-ring 20 absorbs vibration during operation of the tool to prevent the housing from coming unscrewed from the tool body. In addition, the O-ring permits a limited range of adjustment in the rotational position of the housing relative to the tool body so that the lamps can be positioned relative to the output shaft. In this manner, the illumination pattern of the apparatus can be adjusted about the shaft 14 of the tool.

A second O-ring 74 is fitted in the housing adjacent the opposite axial end of the stepped section 64, opposite the O-ring 20, and functions as a compression spring to accommodate variations in the dimensions of the support plate 26 and stator element 34 within the housing, and to apply pressure on the support plate and stator assembly to hold them in place within the housing without turning into contact with the magnet 32.

The miniature generator and lighting apparatus can either be provided as a retrofit assembly that is assembled on a tool during or subsequent to manufacture, or as an integral part of the original tool design. If constructed as a retrofit, the housing assembly 30 will include a means as shown and described herein for securing the housing to the body of the tool. However, where the apparatus is designed into the tool, there is no need for a separate housing for the generator and lighting apparatus, and the functions performed by the housing assembly of the preferred embodiment are designed into the tool body.

In operation, when power is supplied to the tool, the output shaft 14 rotates, causing the magnet 32 to rotate within the stator assembly 24, generating a current in the winding 36 that supplies an electric current across the wire ends 44. This current is supplied through the circuit 52 on the support plate 26 to the socket leads, and powers the lamps to illuminate the area immediately in front of the distal end of the tool. When power to the tool is cut off, the shaft stops rotating and current through the winding falls off so that the lamps go dark. Thus, In order to energize the lamps, the tool must be powered.

Figure 7:
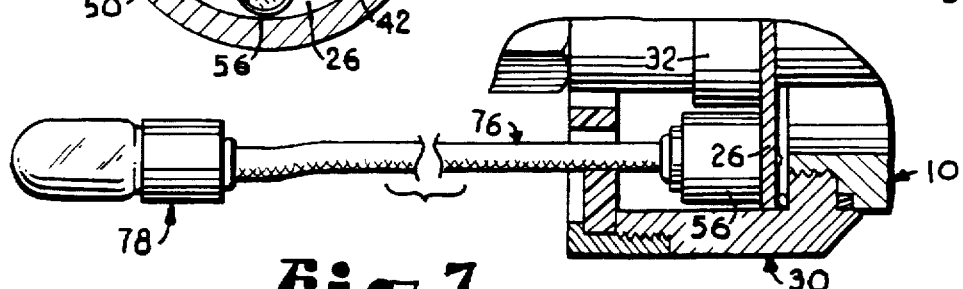
FIG. 7 is a fragmentary sectional view similar to FIG. 4, illustrating an alternate construction of the invention.

If desired, the generator can be used to provide power for uses other than lighting the lamps. For example, the generator can be connected, via a transformer, to a battery charger located either internally or externally of the tool for charging replacement batteries. By providing this construction, the batteries could be used either in the tool itself, e.g. where the tool is an electric tool that is convertible for use with either AC or DC power, or in other tools that require a DC power source, such as a radio, drop light or the like. Likewise, the generator could be employed with an extension cord 76, as shown in FIG. 7, so that electricity can be supplied to a remote drop light 78 or other implement, as desired.

Although the miniature generator and lighting apparatus of the preferred embodiment is disclosed with reference to tools, it can also be used on other mechanisms in which a driver rotary shaft is available for supporting and rotating the magnet within the stator assembly. As such, although the present invention has been described with reference to the preferred embodiment, it is noted that equivalents may be employed and substitution made herein without departing from the scope of the invention as recited in the claims.

What is claimed is:

1. A miniature electric generator and lighting apparatus for a power-driven tool, wherein the tool includes a rotary output shaft, the apparatus comprising:

a rotor including a permanent magnet affixed to the rotary output shaft of the tool;

a stator including a pair of electrically conductive arms extending on opposite sides of the rotor, an electrically conductive shank connecting the arms together, and a winding of electrically conductive wire supported on the shank and presenting a pair of opposed ends;

a lamp;

electrical conductors connecting the ends of the winding to the lamp to form a circuit for supplying current to the lamp upon rotation of the rotor within the stator; and a tubular housing supporting the stator on the tool, the housing presenting radially opposed inner and outer surfaces and including a means for securing the housing in place on the tool and a positioning means for positioning the stator relative to the magnet of the rotor to prevent contact between the stator and the magnet during rotation of the output shaft, the positioning means including a step protruding radially inward from the inner surface of the housing, and a means for holding the stator against the step.

2. An apparatus as recited in claim 1, wherein the means for securing the housing in place on the tool includes a threaded section provided on the inner surface of the housing.

3. An apparatus as recited in claim 1, wherein the means for holding the stator against the step includes a pin secured to the housing and engaging the stator to force the stator against the step.

4. An apparatus as recited in claim 3, further comprising an O-ring interposed between the stator and the step, the O-ring being formed of a material that is resilient relative to the housing.

5. An apparatus as recited in claim 1, wherein the housing includes a face plate and a means for securing the face plate on the distal end of the housing, the face plate including a central aperture sized for receipt of the output shaft of the tool, and a cutout through which the lamp is visible.

6. An apparatus as recited in claim 5, wherein the means for holding the stator against the step includes a pin secured to the face plate, the pin engaging the stator when the face plate is secured to the housing and forcing the stator against the step.

7. A miniature electric generator and lighting apparatus for a power-driven tool, wherein the tool includes a rotary output shaft, the apparatus comprising:

a rotor including a permanent magnet affixed to the rotary output shaft of the tool;

a stator including a pair of electrically conductive arms extending on opposite sides of the rotor, an electrically conductive shank connecting the arms together, and a winding of electrically conductive wire supported on the shank and presenting a pair of opposed ends;

a lamp;

electrical conductors connecting the ends of the winding to the lamp to form a circuit for supplying current to the lamp upon rotation of the rotor within the stator;

a housing supporting the stator on the tool, the housing including a means for securing the housing in place on the tool, and a positioning means for positioning the stator relative to the magnet of the rotor to prevent contact between the stator and the magnet during rotation of the output shaft; and a support plate including a central cutout sized for receipt of the output shaft of the tool, and first and second axially opposed, generally planer side surfaces, the stator being secured to the first surface of the support plate so that the support plate and stator are together held against contact with the magnet of the rotor by the positioning means.

8. An apparatus as recited in claim 7, wherein the support plate is formed of an electrically insulative material, the electrical conductors including a printed circuit applied to the second surface of the support plate.

9. An apparatus as recited in claim 8, further comprising a socket secured to the support plate and presenting a pair of terminals connected to the printed circuit, the lamp being adapted for receipt in the socket.

10. A miniature electric generator apparatus for use on a mechanism, wherein the mechanism has a shaft that is rotated during use, the apparatus comprising:

a rotor including a permanent magnet affixed to the shaft;

a stator including a pair of electrically conductive arms spaced radially outwardly from the magnet and extending on opposite sides of the shaft, an electrically conductive shank connecting the arms together, and a winding of electrically conductive wire supported on the shank and presenting a pair of opposed ends across which a current can be drawn during rotation of the shaft of the mechanism;

a positioning means for positioning the stator around the magnet to prevent contact between the stator and the magnet during rotation of the magnet within the stator; and a tubular housing for supporting the stator on the mechanism, the housing presenting radially opposed inner and outer surfaces, and being sized for receipt over the output shaft of the mechanism, the positioning means, including a step protruding radially inward from the inner surface of the housing, and a first biasing means for biasing the stator axially toward the step and a second biasing means disposed between the stator and the step for opposing the force of the first biasing means.

11. An apparatus as recited in claim 10, wherein the first biasing means includes a pin secured to the housing and engaging the stator to force the stator toward the step.

12. An apparatus as recited in claim 11, further comprising an O-ring interposed between the stator and the step, the O-ring being formed of a material that is resilient relative to the housing.

13. An apparatus as recited in claim 10, wherein the housing includes a face plate and a means for securing the face plate on the distal end of the housing, the face plate including a central aperture sized for receipt of the output shaft of the mechanism.

14. An apparatus as recited in claim 13, wherein the first biasing means includes a pin secured to the face plate, the pin engaging the stator when the face plate is secured to the housing and forcing the stator against the step.

15. An apparatus as recited in claim 10, further comprising a support plate including a central cutout sized for receipt of the output shaft of the mechanism, and first and second axially opposed, generally planer side surfaces, the stator being secured to the first surface of the support plate so that the support plate and stator are together held against contact with the magnet of the rotor by the positioning means.

16. An apparatus as recited in claim 15, wherein the support plate is formed of an electrically insulative material, the apparatus further comprising a printed circuit applied to the second surface of the support plate, the printed circuit being connected to the opposed ends of the winding.

17. An apparatus as recited in claim 16, further comprising a socket from which electricity generated by the apparatus can be drawn, the socket being secured to the support plate and presenting a pair of terminals connected to the printed circuit.

* * * * *